United States Patent [19]

Geerkens

[11] 4,242,877
[45] Jan. 6, 1981

[54] HEAT-EXCHANGER ELEMENT FOR A FREEZE DRIER

[76] Inventor: Friedhelm Geerkens, Schwalbenstr. 3, 4044 Kaarst, Fed. Rep. of Germany

[21] Appl. No.: 884,573

[22] Filed: Mar. 8, 1978

[30] Foreign Application Priority Data

Mar. 8, 1977 [DE] Fed. Rep. of Germany ....... 2709961

[51] Int. Cl.³ ............................................ F25D 17/06
[52] U.S. Cl. ...................................... 62/93; 62/186; 62/150; 62/155; 55/269; 165/141
[58] Field of Search ............... 165/100, 154, 155, 101; 165/141; 62/93, 186, 150, 155; 55/269

[56] References Cited

FOREIGN PATENT DOCUMENTS 6751238 1/1969 Fed. Rep. of Germany .
644967 9/1962 Italy .......................................... 165/154

Primary Examiner—Albert W. Davis
Assistant Examiner—Margaret A. Focarino

Attorney, Agent, or Firm—Lerner, David, Littenberg & Samuel

[57] ABSTRACT

The invention relates to a heat-exchanger element for a freeze drier, which includes an outer pipe for the through-flow of freezing mixture, and an inner pipe, disposed within the outer pipe, for the through-flow of the gas to be dried, and which is characterized by a core pipe, located within the inner pipe, for through-passage of a fluid. The bore of the core pipe may be in communication at at least one end, and preferably at both ends, of the heat-exchanger element with the bore of the outer pipe. A feed pipe for the through-passage of a second fluid is preferably provided at the end of the core pipe. There may be provided between the end of the core pipe on the one hand and two fluid feed pipes on the other hand a valve means of which the core pipe can be placed in communication with one and/or the other feed pipe. The invention also relates to a freeze drier with a gas/freezing mixture heat-exchanger with heat-exchanger elements as aforesaid, and to a process for freeze-drying of gas utilizing such a heat-exchanger.

11 Claims, 7 Drawing Figures

HEAT-EXCHANGER ELEMENT FOR A FREEZE DRIER

The invention relates to a heat-exchanger element for a freeze drier, consisting of an outer pipe for the through-flow of freezing mixture, and an inner pipe disposed within the outer pipe, for passing through the gas to be dried.

Such a heat-exchanger element has already been proposed in the applicant's Patent Application No. 49379/77. According to this Patent Application, the exchanger element consists of an external or outer pipe and an internal or inner pipe arranged coaxially thereto.

Conventionally, a coolant liquid, where such is used, is passed through the inner pipe, because there is better heat-transfer between coolant liquid and pipe wall than between the fluid to be cooled, e.g. a gas to be dried and the wall of the heat-exchanger pipe. Thus the fluid with the poorer heat-exchange capacity is passed through the pipe component which has the larger exchanger area. This is the outer pipe in the pipe-in-pipe construction described.

These so-called smooth-bore coaxial exchanger elements are chiefly used for freeze driers which make use of the cyclone principle and bring about precipitation of, for example, drops of moisture on the outer walls of a helically-wound condensing pipe by helical guidance of the gas. The pipe-in-pipe construction is particularly advantageous in this construction which requires winding of the condensing pipe.

A disadvantage of the smooth-bore coaxial construction initially described is that the refrigeration capacity is limited by the fact that the temperature of the freezing mixture may not fall below a specific value if allowance is to be made for the danger of icing. This means that the dew-point temperature of, for example, a gas to be dried may be reduced only to about $+2°$ C., if it is to be ensured that the wall which is situated between the freezing mixture and the gas to be dried, is not iced. The operating conditions become more difficult when the throughput of gas to be dried is subjected to fluctuations because with a sudden drop of the throughput of the gas to be dried, there may occur an excessively-intensive cooling-off of the exchanger walls around which the freezing mixture flows and thus incrustation thereof with ice.

The problem to be solved by the invention is to improve the known construction of smooth-bore coaxial heat-exchanger elements in such a way that firstly a further reduction of the dew-point temperature of a gas to be dried is possible, e.g. to $1.5°$ C. and less, without there being any danger of freezing. Secondly, the new construction must, however, also be unaffected by fluctuations in throughput of the gas to be dried.

The problem is solved, in accordance with the invention, in that a core pipe for through-passage of a fluid is provided within the inner pipe.

This results in a construction of three pipes inserted into one another, which is of course somewhat more expensive in production than the previous pipe-in-pipe construction with only two pipes one within the other, yet with the considerable advantage that there may be passed through the core tube a fluid by means of which, by appropriately controlling the heat of this fluid, icing of the inner pipe through which flows the gas to be dried, for example, is prevented or again eliminated.

For many purposes it may already be sufficient if, in accordance with an advantageous development of the invention, the bore of the core pipe is in communication at at least one end and preferably at both ends, of the heat-exchanger element, with the bore of the outer pipe. If the freezing mixture is passed through the outer pipe, a flow of freezing mixture through the core pipe results at the same time. If, in addition, the gas to be dried is conveyed in the inner pipe in the opposite direction to that of the freezing mixture in the outer pipe and core pipe, there is the advantageous effect that, because of the higher resistance to throughflow in the core pipe, the freezing mixture in the core pipe begins to warm up, in its course through the heat-exchanger, to a greater extent than in the external tube. The heat radiation and heat-convection produced therewith at the inner surface of the inner pipe prevents the formation of ice on this surface within a wide range of operational conditions.

In accordance with yet another embodiment, feed provision may be made at the end of the core pipe for the through-passage of a second fluid. The possibilities of control are thereby improved, e.g. by supplying a fluid at a specific temperature through this second feed. By this means dependence need no longer be placed on the drop in pressure and the consequential warming-up of the freezing mixture.

It is also advantageous if there is provided between the end of the core pipe and the two fluid feed pipes a valve by means of which the core pipe can be placed in communication with one and/or the other feed pipe. In this way a particularly simple and effective control of the temperature of the fluid or fluid mixture flowing in the core pipe is possible.

The invention also relates to a freeze drier with a gas/freezing mixture heat exchanger which has heat-exchanger elements of the kind hereinbefore described above. Such a freeze drier may be provided with at least one heat exchanger element of the kind stated which is arranged as a helix with a substantially vertical axis.

If the cyclone is not to be used, it is also possible to provide several heat-exchanger elements which extend substantially in a straight line and parallel to one another. It is particularly favourable for precipitation of condensate if these elements in addition extend vertically or at least obliquely.

For the same reason it is most often also appropriate to provide the end of the element, to which the freezing mixture is fed, at the lower end of the helix. In this way the gas to be dried, which most advantageously flows in the opposite direction, may be drawn off at the lower end, so that the deposition of condensate and dirt turns out to best advantage.

In accordance with another embodiment of the freeze drier according to the invention, there is a source of hot gas, which is a communication with the other fluid supply. This enables the temperature of the fluid flowing through the core pipe to be simply regulated by adding hot gas in determined amounts.

The hot gas supply may be brought about, for example, by connecting the valve with a controlling device which alters the valve at determined intervals in such a way that hot gas, instead of freezing mixture, is passed through the core pipe. Any ice whatsoever which could have been deposited in the meantime on the walls of the inner pipe is thereby thawed off within, for example, a few seconds, and is carried off in the form of running-off condensate. The controlling device may be so constructed that the switch-over takes place at fixed time intervals, or even as occasion demands.

The invention also relates to a process for the freeze drying of gas with a heat-exchanger of the kind hereinbefore stated. This process is characterised in accordance with the invention, in that a freezing mixture is passed through the outer pipe in one direction, a further freezing mixture is passed through the core pipe in the same direction, and the gas is directed through the inner pipe in the opposite direction. The advantages of this procedure have already been described.

In accordance with a further embodiment of the process according to the invention, hot gas is temporarily directed through the core pipe at intervals and any ice deposit, which may have meantime been formed, is thawed off.

The process is particularly simple if the freezing mixture at the outer pipe supply and at the core pipe supply is taken from a common supply. On the other hand, there is a greater variety of control possibilities if the freezing mixtures at the outer pipe supply and at the core pipe supply differ from one another in type and/or temperature.

It may, in addition, be advantageous if the freezing mixtures in the outer pipe and in the core pipe have different velocities of flow.

It has proved to be particularly advantageous when the temperature of the freezing mixture is between −1° and −4° C. at the entry to the outer pipe, between 0° and +3° C. at the outlet from the outer pipe, between 0° and −3° C. at the entry to the core pipe, and between +10° and +20° C. at the outlet from the core pipe.

The invention will hereinafter be described in more detail with the help of embodiments which are represented in the drawings.

They show:

FIG. 1 a perspective, partly cut view of one end of a heat-exchanger element in accordance with the invention;

FIG. 2 diagrammatically the end represented in FIG. 1 of a heat-exchanger element in communication with a second fluid supply and a valve;

FIG. 3 extremely schematic view of the construction of a freeze drier equipped with a heat-exchanger element in accordance with the invention; and FIG. 4 a graphical representation of the variation in temperature of the freezing mixture in flow along the length of the heat-exchanger within the core pipe (upper curve) and the outer pipe (lower curve).

Figure 1:
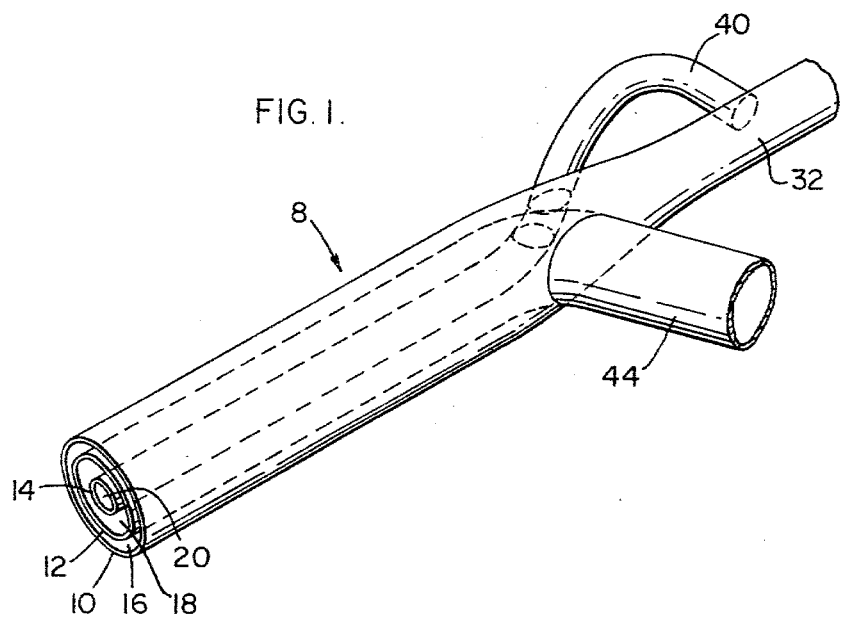

FIG. 1 represents the end of a heat-exchanger element in accordance with the invention, which consists of an outer or casing pipe 10, an inner pipe 12 located within this outer pipe, and a further core pipe 14 located within the inner pipe 12. The three pipes are disposed substantially coaxially to one another, slight displacements which may occur during manufacture being of no significance. Of course, it must be avoided that the tubes move out of the coaxiality to such an extent that they are in mutual contact with one another, because then firstly there follows the possibility of dirt deposits at the contact points, and secondly a direct transfer of heat between the individual pipes becomes possible and can adversely influence the operation of the heat-exchanger under certain working conditions. It should however be expressly emphasised that even in this event the advantages of the heat-exchanger element in accordance with the invention still prevail.

Figure 2:
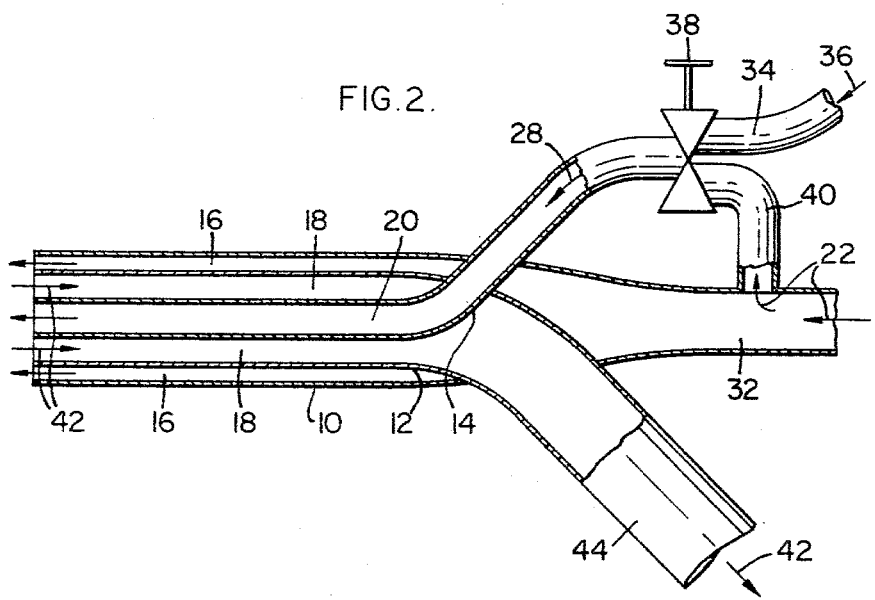

Three different passages are formed by the three pipes situated within one another, see also FIG. 2; a first passage 16 results between the inner surface of the casing pipe 10 and the outer surface of the inner pipe 12. A second passage 18 results between the inner wall of the inner pipe 12 and the outer wall of the core pipe 14, while the third passage 20 is formed by the bore of the core pipe 14. The pipes consist preferably of a material of good heat-conductivity, e.g. copper pipe.

At the end of the heat-exchanger element, which is provided with the general reference numeral 8, the three passages are put into effect in the form of three separated conduits, the form of construction shown representing only one embodiment. It is preferably to construct the passages in such a way that there is as small a resistance as possible to flow, i.e. that sharp corners and edges are avoided where possible.

The heat-exchanger element 8 described can be used with particular advantage in freeze driers the purpose of which is to free a gas, for example compressed air, as much as possible from moisture. This is effected in that the gas is brought to the lowest possible temperature, so that the water, previously in the form of vapour, precipitates in liquid form. This procedure is also described as lowering the dew point temperature, i.e. the temperature at which moisture is deposited in the form of mist.

Figure 3:
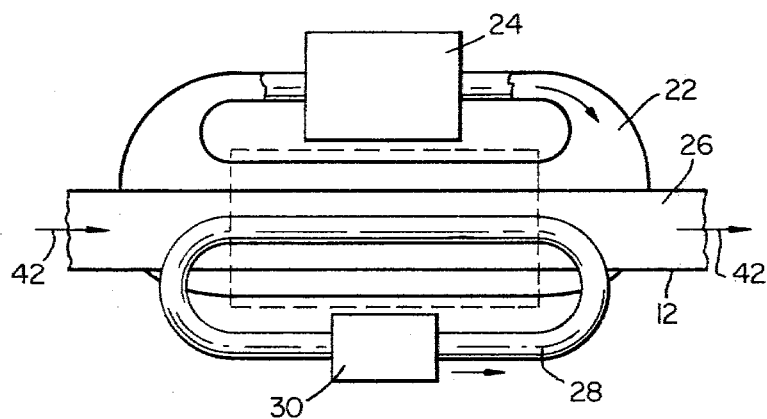
Figure 4:
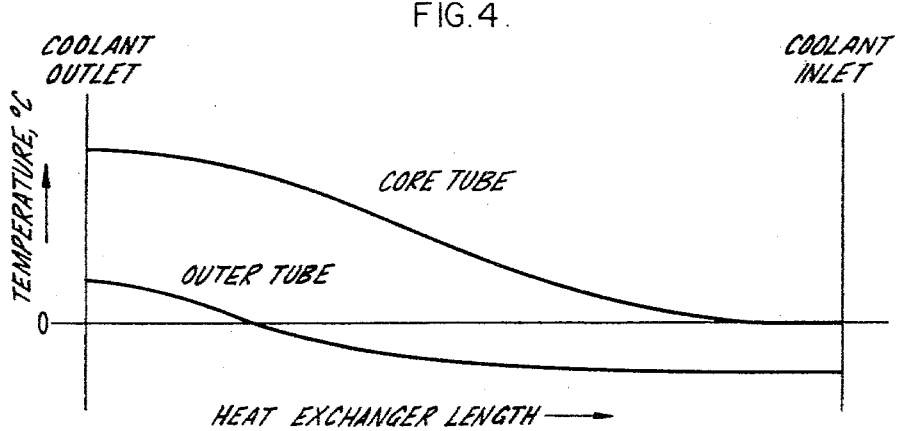
Figure 5:
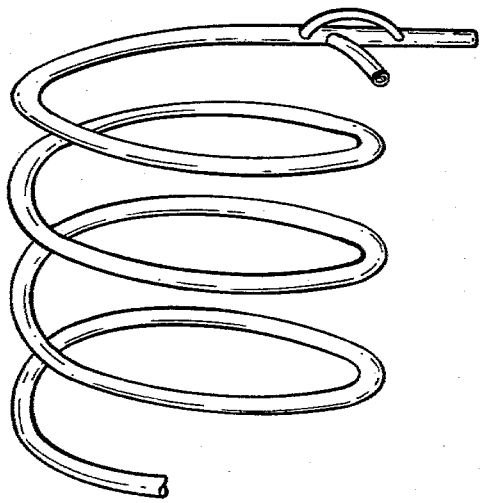
FIG. 5 is a perspective front view of a freeze drier in accordance with the present invention in which the heat exchanger element is arranged as a helix with a substantially verticle axis.
Figure 6:
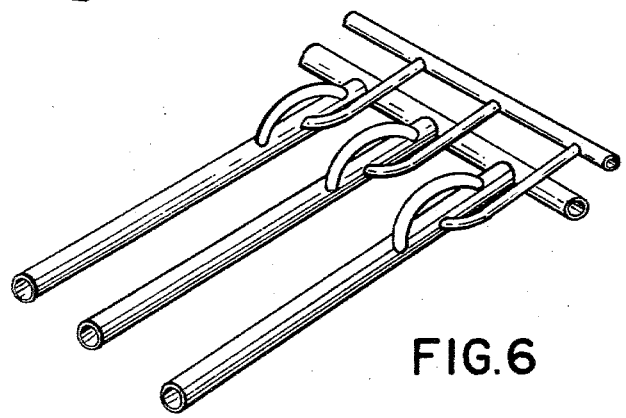
FIG. 6 is a perspective view of a freeze drier in accordance with the present invention in which the heat exchanger elements extend obliquely.
Figure 7:
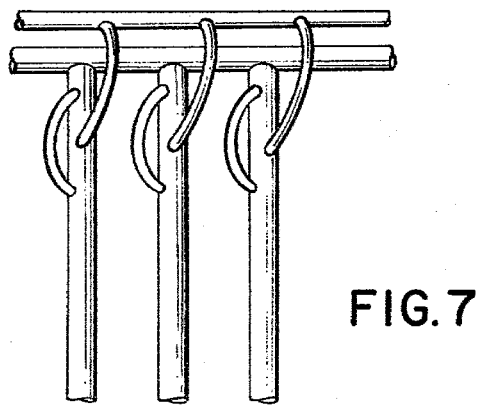
FIG. 7 is a perspective view of a freeze drier in accordance with the present invention in which the heat exchanger elements extend vertically.

The cooling-down of the gas is effected in so-called heat-exchangers, in which, see for example FIG. 3, the gas is passed through a pipe 12 the walls of which are sourrounded by a freezing mixture 22. The freezing mixture itself may, for example, be contained in a closed circuit which also includes a refrigerator 24.

The temperature of the freezing mixture 22 cannot then be lowered to any desired level, because, when the walls of the pipe 12 assume a temperature below the freezing point of the precipitating water, the interior of the pipe 12 is slowly covered with ice. The temperature of the freezing mixture 22 and thus that of the walls of the pipe 12 must therefore be just above the temperature of the freezing water, i.e. under normal operational conditions above 0° C. Should the gas to be dried contain not water, but another liquid, which is to be separated off, similar considerations apply, the temperature of 0° C. not being selected, but instead the appropriate freezing point of the liquid to be separated off.

Because of the risk of icing, it has not hitherto been possible with freeze driers to bring the dew-point temperature of the gas to be dried down to less than about +2° C. The situation became particularly critical if the throughput of air to be dried fluctuated, as at a higher throughput there is a higher mean velocity of flow for the gas and thus also the necessity for more intense refrigeration by the freezing mixture. More intense refrigeration by the freezing mixture, however, usually signifies also a lower temperature of the freezing mixture, which may even be well below the freezing point. If the throughput of gas to be dried now falls off, the inner surfaces of the inner pipe 12 are chilled to below the freezing point and a layer of ice is formed, which not only reduces the heat-exchange capacity, but also reduces the lumen of the pipe 12 and thus increases the resistance to flow. In extreme cases, the whole pipe 12 may freeze up.

In order to prevent such ice formation within the inner pipe 12, there is provided the core pipe 14 through which flows a fluid 28 the temperature of which at each point within the heat-exchanger element is higher than the temperature of the freezing mixture 22. The fluid may consist of a liquid or gaseous freezing mixture, or even of a hot gas, e.g. superheated steam. In FIG. 3 the fluid 28, like the freezing mixture 22, passes through a closed circuit, which likewise includes a refrigerator 30.

As a result of the higher temperature of the outer wall of the core pipe 14 relative to that of the inner wall of the inner pipe 12, there is radiation of heat from the outer wall of the core pipe 14 to the inner surface of inner pipe 12, and moreover convection through the gas flowing through the lumen 18. Through this transfer of heat from the core pipe to the inner surface of the inner pipe 12 either the formation of ice on the inner surface of the inner pipe 12, is wholly prevented, or layers of ice already formed are thawed off again or are prevented from increasing. If, for example the layer of ice increases because of reduced throughput of gas to be dried, the lumen 18 becomes narrower. Therewith the space between the layer of ice and the core pipe becomes smaller, and the effect of the heat transferred by radiation and convection from the core pipe to the layer of ice is increased. A state of equilibrium is thereby reached and prevents further increase of the layer of ice. The fact that the flow resistance is increased as a result of the reduction in the lumen is then not so serious, if at the same time the rate of flow is low, which often brought about the danger of freezing up. The very simple arrangement thus described therefore requires no control devices, as automatic control occurs in a positive manner through the circumstances described.

However, sensors (not shown) may also be provided at various points of the heat-exchanger elements 8 which sensors measure the temperature of the inner wall of the pipe 12 or even confirm the presence of ice on this inner wall. With the help of these measured results, either in the rate of flow and/or the temperature of the freezing mixture 22 may then be changed in such a way that the layer of ice disappears, or, more advantageously, the rate of flow and/or the temperature of the fluid 28 is increased so that the layer of ice in the inner pipe 12 is caused to melt. Regulating devices of this kind are in the state of the art and need not be described here in more detail.

Instead of directing fluid 28 and freezing mixture 22 through separate circuits, as is shown in FIG. 3, it may be appropriate to take the fluid 28 from the circuit of the freezing mixture 22 itself. For this purpose, according to FIG. 1, the core pipe 14 is connected at the input to the heat-exchanger element 8 with the pipe 32 for feeding the freezing mixture 22 into the lumen of the outer pipe 10. As the resistance to flow in the core pipe 14 for the freezing mixture 22 is considerably greater than is the case of the outer pipe 10 with its considerably larger lumen, the freezing mixture warms up during its passage through the heat-exchanger because of the contact with the gas 26, considerably more rapidly than is the case with the freezing mixture flowing in the outer pipe 10. A further temperature differential results from the fact that the freezing mixture in the lumen of the outer pipe 10, which is more favourable to flow, more rapidly reaches a lower pressure and thus evaporates earlier and produces a lower temperature, than is the case in the core pipe.

In order to render this arrangement even more effective, it may be appropriate to make allowance for a certain degree of icing. In order to prevent icing from progressing so far that there are operating problems, precautions should however in this case be taken to thaw off the ice layer formed at specific intervals of time, or as required. For this purpose a feed pipe 34 is provided according to FIG. 2 at the end of the core pipe 20 in order that a further fluid 36 can be passed through the core pipe. This further feed pipe 34 may form, with a corresponding arrangement at the other end of the heat-exchanger 8, yet another closed circuit, the arrangement thus formed differing from the arrangement shown in FIG. 3 not only to the extent that there is communication between the two circuits respectively at the beginning and the end of the heat-exchanger, but fluid 36 and freezing mixture 22 are then also the same. The advantage of this embodiment resides in that the refrigerator 30 need only be switched on as occasion demands, while under normal circumstances only the refrigerator 24 need operate.

Instead of exerting control by appropriate switching on and off of the refrigerator 30, it would also be feasible to provide a valve 38, with which it is possible to connect the lumen of the core pipe 20 either with the feed pipe 34 or with the branch 40 emanating from the feed pipe 32. It might also be appropriate to undertake an adjustable mixture between the flow 22 and the flow 36.

If the valve 38 is provided, there may be used as fluid 36 a heating gas obtained from freezing mixture and which is passed for a few seconds at specific intervals through the core pipe 20 and thus melts off all ice deposits in the inner tube 12 in this short period of time. If then, after the melting, the valve 38 is again switched over to the branch 40, regular freezing mixture 22 again flows through the core pipe 20.

The supply of heating gas freezing mixture by means of the valve 38, or even in some other way may be made dependant on the thickness of the ice in the inner tube; it may also however be linked in a precise manner with the throughput capacity of the freeze drier, so that it is ensured that at any given time no operating troubles occur as a result of an excessively-thick ice coating.

Although the heat-exchanger element is shown substantially horizontal in FIGS. 2 and 3, the arrangement will usually be such that the gas to be dried, which flows in the direction of the arrow 42, always has a downwardly-directed component. This considerably facilitates the separation of the precipitated water of condensation. The heat-exchanger element 8 may, moreover, be helically coiled, the axis of the helix being vertical and the outlet end for the gas and thus also the outlet end for the separated water being at the lower end of the helix. Instead of the helical arrangement, a straight-line arrangement of the heat-exchanger element 8 may also be advantageous, although in so doing, it will then be expedient to make up the heat exchanger from several heat-exchanger elements which are disposed parallel to one another, and indeed at least inclined, preferably even vertical, the lower end of the respective exchanger element also in this case being the outlet end for gas and condensate.

The fluid or freezing mixture flowing within the core pipe 14, and also within the outer pipe 10, on the contrary flows in a direction contrary to the flow of gas, as is also indicated by the arrows in the various Figures. Energy costs are saved through this counterflow principle, as the approaching gas is precooled shortly before emerging from the heat-exchanger by the freezing mixture which is already slightly warmed up, before the gas is brought to its lowest temperature by means of the coldest freezing mixture at the other end of the heat-exchanger.

In an experimental arrangement which corresponded to that represented in FIG. 1, the following temperatures were determined at full load: temperature of the freezing mixture flowing in the feed pipe 32: $-1°$ C.; temperature of the freezing mixture shortly after flowing into the branch 40: 0° C.; temperature of the gas 42 emerging from the gas outlet 44: $+1.5°$ C.; temperature of the freezing mixture 22 emerging from the outer pipe 10 at the other end of the exchanger element: $+3°$ C.; temperature of the freezing mixture emerging from the core pipe 14 at the other end: $+15°$ C.; temperature of the gas supplied; 35° C.

I claim:

1. A heat exchanger element for cooling and drying a gas, said element comprising an outer tube for the through-flow of a freezing mixture, an inner tube disposed within the outer tube for the through-flow of a gas to be dried, and a core tube located within the inner tube for the through-flow of a first fluid component, wherein a feed tube for the through passage of a second fluid component is provided at an end of said core tube.

2. A heat-exchanger element as set forth in claim 1, including a second feed pipe for through-passage of freezing mixture to said outer pipe, a branch pipe from said second feed pipe, and a valve common to second feed pipe and said branch pipe and adapted to control communication between said second feed pipe and said branch pipe on the one hand and said core pipe on the other hand.

3. A freeze drier comprising a heat exchanger with heat-exchanger elements according to claim 2, at least one of said heat-exchanger elements being arranged as a helix with a substantially vertical axis.

4. A freeze drier comprising a heat exchanger with heat-exchanger elements as set forth in claim 2 and which extend substantially in a straight line and parallel to one another.

5. A freeze drier as set forth in claim 4, in which said heat-exchanger elements extend vertically.

6. A freeze drier as set forth in claim 4, in which said heat-exchanger elements extend obliquely.

7. A freeze drier as set forth in claim 3, in which the end of the heat-exchanger element at the lower end of the helix is that to which the freezing mixture is fed.

8. A freeze drier as set forth in claim 7, including a source for a heating gas and which is in communication with said first-mentioned feed pipe.

9. A freeze drier as set forth in claim 8, including a controlling device to which said valve is connected and which is in a position to control the valve at determined intervals in such a way that, instead of freezing mixture, the heating gas obtained from freezing mixture is passed through said core pipe.

10. A freeze drier as set forth in claim 9, in which said controlling device is adapted to switch-over the valve at fixed time intervals.

11. A freeze drier as set forth in claim 9, in which said controlling device is adapted to switch-over the valve as occasion demands.

* * * * *